(12) United States Patent
Sapienza et al.

(10) Patent No.: US 6,540,934 B2
(45) Date of Patent: Apr. 1, 2003

(54) CORROSION INHIBITED RUNWAY DEICING FLUID

(75) Inventors: Richard Sapienza, Shoreland, NY (US); William Ricks, Westerville, OH (US); Joseph Sanders, Columbus, OH (US)

(73) Assignee: Metss Corporation, Westerville, OH (US)

( * ) Notice: Subject to any disclaimer, the term of this patent is extended or adjusted under 35 U.S.C. 154(b) by 0 days.

(21) Appl. No.: 09/905,158

(22) Filed: Jul. 13, 2001

(65) Prior Publication Data

US 2003/0015685 A1 Jan. 23, 2003

(51) Int. Cl.$^7$ ............................. C09K 3/18; C23F 11/00
(52) U.S. Cl. ................... 252/70; 106/14.13; 106/14.14; 106/14.41; 106/14.42; 106/14.44; 106/13; 252/388; 252/394; 252/396
(58) Field of Search .................. 252/70, 388, 394, 252/396; 106/13, 14.13, 14.14, 14.41, 14.42, 14.44

(56) References Cited

U.S. PATENT DOCUMENTS

| | | | |
|---|---|---|---|
| 2,233,185 A | | 2/1941 | Smith |
| 3,711,409 A | | 1/1973 | Ayres et al. |
| 4,223,129 A | | 9/1980 | Roth et al. |
| 4,329,449 A | | 5/1982 | Roth et al. |
| 4,561,990 A | * | 12/1985 | Darden .................. 252/389.54 |
| 4,647,392 A | | 3/1987 | Darden et al. |
| 4,676,919 A | * | 6/1987 | Zientek .................. 252/389.31 |
| 4,960,531 A | | 10/1990 | Connor et al. |
| 5,366,651 A | * | 11/1994 | Maes et al. .................. 252/390 |
| 5,387,359 A | | 2/1995 | Himmrich et al. |
| 5,435,930 A | | 7/1995 | Chan et al. |
| 5,482,639 A | | 1/1996 | Archer et al. |
| 5,489,391 A | * | 2/1996 | Nawa et al. .................. 252/73 |
| 5,507,861 A | | 4/1996 | Caupin et al. |
| 5,876,621 A | | 3/1999 | Sapienza |
| 5,961,875 A | * | 10/1999 | Miyake et al. .................. 252/76 |
| 5,980,774 A | | 11/1999 | Sapienza |
| 6,080,331 A | * | 6/2000 | Meszaros et al. .............. 252/76 |
| 6,290,870 B1 | * | 9/2001 | Turcotte et al. ................ 252/76 |

FOREIGN PATENT DOCUMENTS

JP 62-252498 * 11/1987

OTHER PUBLICATIONS

"Common Ice Melter Ingredients" VIGORO Aug. 30, 1998, pp. 1–3 of 3 Homepage designed and maintained by Adam Zimmer (c) 1996 (No Month).

* cited by examiner

*Primary Examiner*—Anthony Green
(74) *Attorney, Agent, or Firm*—Hedman & Costigan, P.C.

(57) ABSTRACT

The present provides novel deicing and anti-icing compositions which are especially adapted for and are highly useful as deicing and anti-corrosion products, especially on many surfaces which require protection against icing and corrosion, such as airport runways.

42 Claims, No Drawings

CORROSION INHIBITED RUNWAY DEICING FLUID

The present invention relates to a deicing fluid. More particularly the present invention relates to a runway deicing fluid. Most particularly the present invention relates to a novel corrosion inhibited runway deicing fluid.

BACKGROUND OF THE INVENTION

The prior art for the products and manufacture of compositions which are useful for deicing and protection from ice formation as well as for prevention of corrosion on various metallic and metal containing surfaces has become quite well developed in the past. Such protection is necessary in many areas, for example, in metal containing equipment exposed to water or steam or water containing mixtures and emulsions. More particularly, the protection is of top priority importance in connection with deicing of areas where mechanical equipment is employed, such as runways and in the care and safety of aircraft surfaces. Exemplary of some of the prior art teachings are as follows.

Ayres et al., U.S. Pat. No. 3,711,409 describes ice-preventative and deicing compositions, which are viscous, stable, oil-in-water emulsions and which consist of a mineral oil as a disperse phase, an emulsifying agent which is a cationic or non-ionic surface-active agent, and an aqueous solution as a continuous phase containing a water absorbing, viscosity maintaining compound and a freezing point depressant.

Darden et al., U.S. Pat. No. 4,647,392 describes corrosion inhibitor compositions for use in aqueous systems and include corrosion inhibitor anti-freeze compositions for use in water-cooled internal combustion engines. The ingredients of the composition are alleged to exercise a synergistic protection effect.

Himmrich et al., U.S. Pat. No. 5,387,359 describes a deicing agent of an alkaline earth metal potassium acetate consisting of calcium, magnesium, potassium, acetate and water. Chan et al., U.S. Pat. No. 5,435,930 describes liquid deicer/anti-icer compositions for use on the exterior surfaces of aircraft which comprises aqueous mixtures of an alkali metal acetate, phosphate, a silicate, an aromatic triazole, a water soluble surfactant and a water soluble dye.

Caupin et al., U.S. Pat. No. 5,507,861 describes corrosion inhibiting compositions which comprise at least one monocarboxylic acid from the group heptanoic acid, nonanoic acid and undecanoic acid and alkali metal and alkaline earth metal salts thereof and a perborate oxidizing agent.

Sapienza, U.S. Pat. No. 5,876,621 describes deicing compositions which are environmentally benign prepared from recovered industrial waste streams comprising hydroxycarbolic acids by alcoholizing at least part of the hydroxycarboxylic acids in the recovered waste stream with an alkyl alcohol, thus converting that part of the hydroxycarboxylic acids to water soluble hydroxycarboxylic acid esters. Sapienza, U.S. Pat. No. 5,980,774 describes a method for making deicing compositions from a variety of organic compounds including but not limited to hydrocarbyl aldosides.

The Homepage publication designed and maintained by Adam Zimmer Copyright 1996 (3 Pages) (Vigoro—Aug. 30, 1998) has a description and listing of "Common Ice Melter Ingredients." The listing is very extensive. It states that the ice melter ingredients can be categorized as pure or blended. The list includes ten specific ingredients and also includes "corrosion inhibitors" and simple blends in general terms.

From a more industrial perspective, deicing fluids for airport runways traditionally have been formulated from ethylene glycol, propylene glycol, urea and mixtures thereof, but these materials have come under scrutiny due to the Clean Water Act. Ethylene glycol-based fluids are toxic and require expensive treatment and disposal. Propylene glycol, although non-toxic, biodegrades too rapidly imposing excess oxygen demand on the environment or the waste treatment facility. As a consequence of these factors, new and more environmentally benign deicing/anti-icing compounds based on potassium acetate (KAc) have begun to replace these traditional fluids in recent years. Potassium acetate is considered to be more environmentally friendly in that it is nontoxic and exerts a low oxygen demand on the environment. Low-molecular weight monocarboxylic acids were recommended as antifreezing compounds, i.e., the alkali salts of formic, acetic, propionic and butyric acids as per U.S. Pat. No. 2,233,185. However, a number of the larger airports in the United States have resisted the conversion to KAc fluids due to concerns over materials compatibility issues with these fluids. Compared to the glycols, the KAc fluids tend to be more corrosive toward certain metals, particularly galvanized steel, used in the construction of in-ground runway light fixtures. Unlike the glycols, potassium acetate is also an electrolyte, and KAc fluids exhibit high conductivity. Because metal corrosion is an electrochemical process, fluids of high conductivity may facilitate corrosion more than low conductivity fluids, and they can have additional detrimental effects on electrical connections within the light fixtures themselves.

Thus, it would represent a notable advance in the state of the art if one could develop a deicing fluid based on potassium acetate which solved the problems of the prior art potassium acetate compositions.

SUMMARY OF THE INVENTION

In solving the problems of the prior art, the present invention embraces and includes novel and highly effective combinations of additives for use as a part of and in conjunction with known and currently used commercial deicing fluids containing monocarboxylic acid salts such as, and particularly potassium acetate and related salts. The novel liquid products of the resulting combinations have unexpected improved characteristics in use. They are particularly useful, as they have combined deicing as well as other desirable properties.

For instance, the advantages of the resulting modified potassium acetate formulations having present the additive fluid of the invention, include reduced conductivity, and improved corrosion protection for metals, especially for galvanized steels such as those used in construction of ground runway lighting fixtures on or near airport runways. These surfaces are especially susceptible to corrosion and damage from atmospheric attack.

In particular the present invention provides a corrosion and conductivity inhibitor used in deicing and/or anti-icing composition comprising aqueous monocarboxylic acid salts, said inhibitor comprising: (a) from about 1 to about 25 weight percent of an organic deicing agent composition selected from the group consisting of glycols, hydrocarbyl aldosides, glycerol, sorbitol and mixtures thereof, and (b) from about 0.1 to about 30 weight percent of (i) a $C_5$–$C_{16}$ aliphatic monobasic acid or the alkali metal, ammonium or amine salt of said monobasic acid, or (ii) a $C_5$–$C_{16}$ hydrocarbyl dibasic acid or the alkali metal, ammonium or amine salt of said acid, or (iii) a mixture of (i) and (ii); and, optionally, (c) from about 0.1 to about 0.5 weight percent of a hydrocarbonyl triazole.

DETAILED DESCRIPTION OF THE INVENTION

The present invention provides a novel corrosion and conductivity inhibitor used in deicing and/or anti-icing composition comprising aqueous monocarboxylic acid salts, said inhibitor comprising: (a) from about 1 to about 25 weight percent of an organic deicing agent composition selected from the group consisting of glycols, hydrocarbyl aldosides, glycerol, sorbitol and mixtures thereof and (b) from about 0.1 to about 30 weight percent of (i) a $C_5$–$C_{16}$ aliphatic monobasic acid or the alkali metal, ammonium or amine salt of said monobasic acid, or (ii) a $C_5$–$C_{16}$ hydrocarbyl dibasic acid or the alkali metal, ammonium or amine salt of said acid, or (iii) a mixture of (i) and (ii); and, optionally, (c) from about 0.1 to about 0.5 weight percent of a hydrocarbonyl triazole.

The aqueous solutions for which the novel corrosion and conductivity inhibitor of the present invention provides corrosion and conductivity inhibition contain carboxylic acids. The carboxylic acid salts may be any of those known to those skilled in the art and are available commercially. Carboxylic acid salts preferred for use in the practice of the present invention comprise the sodium or potassium salts of formates, acetatates, propionates, butyrates and mixtures thereof Especially preferred is potassium acetate. The carboxylic acid salts are present in an aqueous solution ranging from about 1 to about 99%, preferably from about 10 to about 90%, and more preferably from about 30 to about 70%, such as for example a 50% aqueous solution.

The first component of the corrosion inhibiting composition of the present invention is an organic deicing agent composition selected from the group consisting of glycols, hydrocarbyl aldosides, glycerol, and sorbitol.

The hydrocarbyl aldosides useful in the practice of the present invention are generally available commercially and are known to those skilled in the art, and can include the di- and polysaccharides. An exemplary hydrocarbyl aldoside which may be used in the practice of the present invention is the glucopyranoside sucrose (table sugar). Preferably, the hydrocarbyl aldosides comprise glucosides, furansosides, maltosides, maltotriosides, glucopyranosides, and mixtures thereof. A preferred hydrocarbyl aldoside is methyl glucoside. Alkyl glucosides can be prepared, for example, as described in U.S. Pat. Nos. 4,223,129 and 4,329,449 which are incorporated herein by reference.

Other useful compounds include sorbitol and other hydrogenation products of sugars, monosaccharides, maltodextrins and sucrose such as maltitol, xylitol and mannitol. These compounds are available commercially and known to those skilled in the art. Likewise the glycols such as ethylene glycol, propylene glycol, diethylene glycol, and dipropylene glycol; and glycerol are compounds which are available commercially and known to those skilled in the art.

The first component of the corrosion inhibitor is present in amounts ranging from about 1 to about 25 weight percent based on the weight of the corrosion inhibitor composition components, preferably from about 5 to about 20 weight percent.

The second component of the corrosion inhibitor of the present invention comprises either (i) a $C_5$–$C_{16}$ aliphatic monobasic acid or the alkali metal, ammonium or amine salt of said monobasic acid, or (ii) a $C_5$–$C_{16}$ hydrocarbyl dibasic acid or the alkali metal, ammonium or amine salt of said acid, or (iii) a mixture of (i) and (ii).

The aliphatic monobasic acid component of the present invention may be any $C_5$–$C_{16}$ aliphatic monobasic acid or the alkali metal, ammonium, or amine salt of said acid, preferably at least one $C_8$–$C_{12}$ aliphatic monobasic acid or the alkali metal, ammonium, or amine salt of said acid. This would include one or more of the following acids or isomers thereof: octanoic, nonanoic, decanoic, undecanoic and dodecanoic, and mixtures thereof. Isononanoic is particularly preferred. Any alkali metal, ammonium or amine can be used to form the monobasic acid salt, however, alkali metals are preferred. Sodium and potassium are the preferred alkali metals for use in forming the monobasic acid salt.

Accordingly, the salts of the monobasic acids may be formed by addition of an alkaline compound such as an alkali metal (sodium or potassium) hydroxide or carbonate, an ammonium compound or an amine. Amines are preferred as these compounds often provide additional corrosion protection and reserve alkalinity to the formulation. Amines salts preferred are the alkanolamines. Exemplary alkanolamines are monoethanolamine (MEA), diethanolamine (DEA), triethanolamine (TEA), monoisopropanolamine (MIPA), diisopropanolamine (DIPA), triisopropanolamine (TIPA), diglycolamine (DGA), 2-amino-2-methyl-1-propanol (AMP) and mixtures thereof and the like. These salts are inexpensive and readily available. The alkanolamine salts can also be produced on site by the addition of the free acid and free organic amine.

The dibasic acid component of the above-described corrosion inhibitor may be any hydrocarbyl $C_5$–$C_{16}$ dibasic acid or the alkali metal, ammonium, or amine salt of said acid, preferably at least one $C_8$–$C_{12}$ hydrocarbyl dibasic acid or the alkali metal, ammonium, or amine salt of said acid. Included within this group are both aromatic and aliphatic $C_5$–$C_{16}$ dibasic acids and salts, preferably $C_8$–$C_{12}$ aliphatic dibasic acids and the salts of said acids. This would include one or more of the following acids: suberic, azelaic, sebacic, undecanedioic, dodecanedioic, the diacid of dicyclopentadiene (hereinafter referred to as DCPDDA), terephthalic, and mixtures thereof. Any alkali metal, ammonium or amine can be used to form the dibasic acid salt; however, alkali metals are preferred. Sodium and potassium are the preferred alkali metals for use in forming the dibasic acid salt. Accordingly, the salts of the dibasic acids may be formed by the addition of an alkaline compound, such as an alkali metal (sodium or potassium) hydroxide or carbonate, to an ammonium compound or an amine. Amines are preferred as these compounds often provide additional corrosion protection and reserve alkalinity to the formula. Alkanolamines are the preferred organic amine for use in forming the dibasic acid salt. Exemplary alkanolamines are described above.

Mixtures of the monobasic and dibasic acid may also be employed. Preferred are compositions employing only the monobasic acid. The monobasic and/or dibasic acid component of the corrosion inhibitor of the present invention is present in amounts ranging from about 0.1 to about 30 weight percent based on the total weight of the corrosion inhibitor components, preferably from about 0.1 to about 15 weight percent.

Optionally, where desired, the present invention may also comprise a hydrocarbyl triazole as a third component (c). These are available commercially and known to those skilled in the art. Preferably this component comprises an aromatic triazole or an alkyl substituted aromatic triazole, for example, benzotriazole or tolyltriazole. The most preferred triazole for use is tolyltriazole, such as sodium tolyltriazole, 50% aqueous. The hydrocarbyl triazole may be employed at concentrations of about 0.1 to about 0.5 weight percent, preferably about 0.1 to about 0.3 weight percent, based on the total weight of the corrosion inhibitor components.

The salts of $C_5$ to $C_{16}$ monobasic and dibasic carboxylic acids with alkali metals, ammonia or organic amines either employed alone or used in combination, have been found to be very effective and highly useful as corrosion inhibitors. They are especially effective when used in combination and conjunction with the optional hydrocarbyl triazoles. Although the $C_5$ to $C_{16}$ monobasic and dibasic carboxylic acid salts of the corrosion inhibitor composition of the present invention are not appreciably soluble in relatively high concentrations, up to and including 50%, of aqueous potassium acetate solutions they can be included and coupled into, the basic potassium acetate fluid by means of a cosolvent. A number of chemical solvents and fluid mixtures and compositions have been found to be useful and effective as cosolvents. Such cosolvents include propylene glycol and compositions comprising a hydrocarbyl aldoside, glycerol and/or sorbitol or mixtures thereof These products were found to be highly effective and very satisfactory as cosolvents for the carboxylates. When used as cosolvents they unexpectedly give the added benefit of providing freezing point depression characteristics to the mixture and also at the same time, reducing the conductivity of the mixture containing them and the ultimate composition.

The above-described deicing and/or anti-icing composition are especially useful in deicing and anti-icing of runways and aircraft, but may also have application as a coolant for internal combustion engines, hydraulic fluids, aqueous cutting oils, paints, soluble oils, metal cutting fluids and greases.

One or more additional conventional corrosion inhibitors may also be employed in combination with the above-described corrosion inhibitor. Such conventional corrosion inhibitors may be employed at concentrations of from about 0.01 to about 5.0 weight percent and may be selected from the group consisting of alkali metal or alkanolamine borates, silicates, benzoates, nitrates, nitrites, and molybdates and the hydrocarbyl triazoles. Organosilane stabilizers may also be employed where desired.

It has been found by actual comparative testing and experimental data that when novel products and compositions prepared in accord with the subject of this invention are used, the potassium acetate deicing fluids having the corrosion inhibitor described herein added thereto show much reduced conductivity properties and greatly improved corrosion protection for the galvanized steel surfaces present on and near the runways so tested.

For example, more specifically, in testing for corrosion rate it was found by testing of resulting corrosion rates that the rate for a currently marketed and used potassium fluid was 3.0 mils/year. By comparison, the corrosion rate for the potassium acetate solution with the improvement of the protective fluid of this invention added thereto was found to be only 0.6 mils/year. This greatly improved value for corrosion rate is much below the usual rate level requirement of 0.85 mils/year for use and acceptable conditions in a typical commercial airport.

The conductivity value for commercial potassium acetate fluid is in the range of 520–540 millimhos/cm. By comparison, a potassium acetate fluid which has been treated with the additive composition of the invention shows a substantial and unexpected lowering of conductivity in the range of 360–390 cm/cm.

As a further advantage for the invention products, it was found by testing for biological oxygen demand and for chemical oxygen demand that the addition of these fluids does not exert any significant increase in oxygen demand over those shown by the conventional potassium acetate fluids now used.

EXAMPLE

A preferred and highly effective deicing and anti-corrosion fluid product which is an example of the product(s) of the invention has the following composition, although it is in no way intended to limit the products of the invention thereto.

| Component | Weight % |
| --- | --- |
| Potassium Acetate (50% aqueous) | 80.00 |
| Propylene Glycol | 9.00 |
| Triethanolamine | 0.18 |
| Monoethanolamine | 0.18 |
| Isononanoic Acid | 0.54 |
| Sodium Tolyltriazole (50% aqueous) | 0.10 |
| Tap Water | 10.00 |

The above-listed ingredients preferably in the weight percent amounts indicated are mixed to produce the deicing composition having both corrosion and conductivity inhibitor properties. The resulting products are aqueous solutions which can be applied by conventional methods and techniques. Their use, as indicated, in connection with and as an additive composition for potassium acetate deicing fluids gives outstanding and unexpected results not obtainable by currently known methods and products. In addition, they have no observed or known side effects nor do they produce undesirable residues.

Many variations of the present invention will suggest themselves to those skilled in the art in light of the above-detailed description. All such obvious modifications are within the full intended scope of the appended claims.

The above-mentioned patents are hereby incorporated by reference.

What is claimed is:

1. A corrosion and conductivity inhibiting deicing and/or anti-icing composition comprising: (a) an effective deicing and/or anti-icing amount of an aqueous solution of a monocarboxylic acid salt, and (b) an effective corrosion and conductivity inhibiting amount of an inhibitor composition comprising (I) from about 1 to about 25 weight percent of an organic deicing agent composition selected from the group consisting of glycols, hydrocarbyl aldosides, glycerol, sorbitol and mixtures thereof, and (II) from about 0.1 to about 30 weight percent of (i) a $C_5$–$C_{16}$ aliphatic monobasic acid or the alkali metal, ammonium or amine salt of said monobasic acid, or (ii) a $C_5$–$C_{16}$ hydrocarbyl dibasic acid or the alkali metal, ammonium or amine salt of said acid, or (iii) a mixture of (i) and (ii); and, optionally, (III) from about 0.1 to about 0.5 weight percent of a hydrocarbonyl triazole.

2. A composition as defined in claim 1 wherein said aqueous solution of a monocarboxylic acid salt comprises an aqueous solution of potassium acetate.

3. A composition as defined in claim 2 wherein said aqueous solution of a monocarboxylic acid salt comprises an aqueous solution comprising from about 10 to about 90 weight percent of potassium acetate.

4. A composition as defined in claim 3 wherein said aqueous solution of a monocarboxylic acid salt comprises an aqueous solution comprising from about 30 to about 70 weight percent potassium acetate.

5. A composition as defined in claim 1 wherein said organic deicing agent comprises an alkyl aldoside.

6. A composition as defined in claim 1 wherein said organic deicing agent comprises methyl glucoside.

7. A composition as defined in claim 1 wherein said organic deicing agent comprises a hydrogenation product of a sugar, monosaccharide, maltodextrin or sucrose.

8. A composition as defined in claim 1 wherein said organic deicing agent comprises propylene glycol.

9. A composition as defined in claim 1 wherein said organic deicing agent comprises glycerol.

10. A composition as defined in claim 1 wherein said organic deicing agent is selected from the group consisting of glucosides, furansosides, maltosides, maltotriosides, glucopyranosides, and mixtures thereof.

11. A composition as defined in claim 1 wherein said component (b)(II) comprises a $C_5$–$C_{16}$ aliphatic monobasic acid or the alkali metal, ammonium or amine salt of said monobasic acid.

12. A composition as defined in claim 11 wherein said component (b)(II) comprises at least one $C_8$–$C_{12}$ aliphatic monobasic acid or the alkali metal, ammonium, or amine salt of said acid.

13. A composition as defined in claim 12 wherein said monobasic acid is selected from the group consisting of octanoic, nonanoic, decanoic, undecanoic and dodecanoic, the isomers thereof, and mixtures thereof.

14. A composition as defined in claim 13 wherein said component (b)(II) comprises the sodium and/or potassium salt of isononanoic acid.

15. A composition as defined in claim 1 wherein said hydrocarbonyl triazole component (b)(III) comprises an aromatic triazole.

16. A composition as defined in claim 15 wherein said aromatic triazole comprises sodium tolyltriazole.

17. A method of improving the corrosion resistance and conductivity resistance of a deicing fluid comprising an effective deicing amount of an aqueous solution of a monocarboxylic acid salt, said method comprising adding to said deicing fluid an effective corrosion and conductivity inhibiting amount of an inhibitor comprising: (a) from about 1 to about 25 weight percent of an organic deicing agent composition selected from the group consisting of glycols, hydrocarbyl aldosides, glycerol, sorbitol and mixtures thereof, and (b) from about 0.1 to about 30 weight percent of (i) a $C_5$–$C_{16}$ aliphatic monobasic acid or the alkali metal, ammonium or amine salt of said monobasic acid, or (ii) a $C_5$–$C_{16}$ hydrocarbyl dibasic acid or the alkali metal, ammonium or amine salt of said acid, or (iii) a mixture of (i) and (ii); and, optionally, (c) from about 0.1 to about 0.5 weight percent of a hydrocarbonyl triazole.

18. A method as defined in claim 17 wherein said aqueous solution of a monocarboxylic acid salt comprises an aqueous solution of potassium acetate.

19. A method as defined in claim 18 wherein said aqueous solution of a monocarboxylic acid salt comprises an aqueous solution comprising from about 30 to about 70 weight percent potassium acetate.

20. A method as defined in claim 17 wherein said organic deicing agent comprises methyl glucoside.

21. A method as defined in claim 17 wherein said organic deicing agent comprises a hydrogenation product of a sugar, monosaccharide, maltodextrin or sucrose.

22. A method as defined in claim 17 wherein said organic deicing agent comprises propylene glycol.

23. A method as defined in claim 17 wherein said organic deicing agent comprises glycerol.

24. A method as defined in claim 17 wherein said organic deicing agent is selected from the group consisting of glucosides, furansosides, maltosides, maltotriosides, glucopyranosides, and mixtures thereof.

25. A method as defined in claim 17 wherein said component (b) comprises at least one $C_8$–$C_{12}$ aliphatic monobasic acid or the alkali metal, ammonium, or amine salt of said acid.

26. A method as defined in claim 25 wherein said monobasic acid is selected from the group consisting of octanoic, nonanoic, decanoic, undecanoic and dodecanoic, the isomers thereof, and mixtures thereof.

27. A method as defined in claim 26 wherein said component (b) comprises the sodium and/or potassium salt of isononanoic acid.

28. A method as defined in claim 17 wherein said hydrocarbonyl triazole component (c) comprises an aromatic triazole.

29. A method as defined in claim 28 wherein said aromatic triazole comprises sodium tolyltriazole.

30. A method for deicing an airport runway said method comprising applying to said runway a corrosion and conductivity inhibiting deicing and/or anti-icing composition comprising: (a) an effective deicing and/or anti-icing amount of an aqueous solution of a monocarboxylic acid salt, and (b) an effective corrosion and conductivity inhibiting amount of an inhibitor composition comprising (I) from about 1 to about 25 weight percent of an organic deicing agent composition selected from the group consisting of glycols, hydrocarbyl aldosides, glycerol, sorbitol and mixtures thereof, and (II) from about 0.1 to about 30 weight percent of (i) a $C_5$–$C_{16}$ aliphatic monobasic acid or the alkali metal, ammonium or amine salt of said monobasic acid, or (ii) a $C_5$–$C_{16}$ hydrocarbyl dibasic acid or the alkali metal, ammonium or amine salt of said acid, or (iii) a mixture of (i) and (ii); and, optionally, (III) from about 0.1 to about 0.5 weight percent of a hydrocarbonyl triazole.

31. A method as defined in claim 30 wherein said aqueous monocarboxylic acid salt comprises an aqueous solution of potassium acetate.

32. A method as defined in claim 31 wherein said aqueous monocarboxylic acid salt comprises an aqueous solution comprising from about 30 to about 70 weight percent potassium acetate.

33. A method as defined in claim 30 wherein said organic deicing agent comprises methyl glucoside.

34. A method as defined in claim 30 wherein said organic deicing agent comprises a hydrogenation product of a sugar, monosaccharide, maltodextrin or sucrose.

35. A method as defined in claim 30 wherein said organic deicing agent comprises propylene glycol.

36. A method as defined in claim 30 wherein said organic deicing agent comprises glycerol.

37. A method as defined in claim 30 wherein said organic deicing agent is selected from the group consisting of glucosides, furansosides, maltosides, maltotriosides, glucopyranosides, and mixtures thereof.

38. A method as defined in claim 30 wherein said component (b)(II) comprises at least one $C_8$–$C_{12}$ aliphatic monobasic acid or the alkali metal, ammonium, or amine salt of said acid.

39. A method as defined in claim 38 wherein said monobasic acid is selected from the group consisting of octanoic, nonanoic, decanoic, undecanoic and dodecanoic, the isomers thereof, and mixtures thereof.

40. A method as defined in claim 39 wherein said component (b)(II) comprises the sodium and/or potassium salt of isononanoic acid.

41. A method as defined in claim 30 wherein said hydrocarbonyl triazole component (b)(III) comprises an aromatic triazole.

42. A method as defined in claim 41 wherein said aromatic triazole comprises sodium tolyltriazole.

* * * * *